United States Patent Office 3,397,298
Patented Aug. 13, 1968

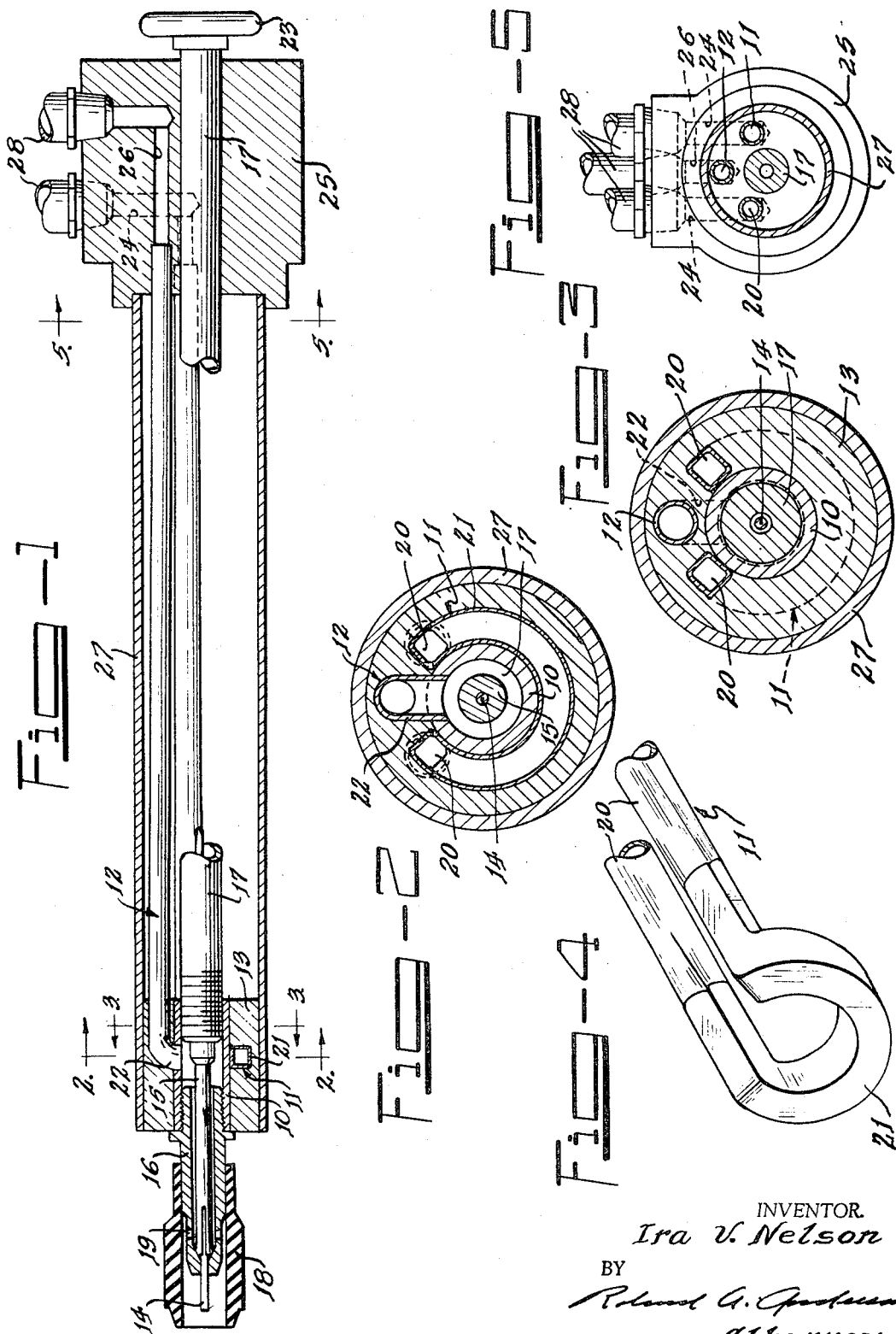

3,397,298
WELDING TORCH
Ira V. Nelson, Richland, Wash., assignor to the United States of America as represented by the United States Atomic Energy Commission
Filed Feb. 8, 1965, Ser. No. 431,234
3 Claims. (Cl. 219—75)

The invention described herein was made in the course of, or under, a contract with the U.S. Atomic Energy Commission.

This invention relates to an inert-gas welding torch and, more particularly, to a construction for supplying the inert gas and a liquid coolant to the torch.

It is difficult and costly to maintain and replace seals in the hot region of a welding torch, which seals are used in lines supplying gas and coolant to the torch. I have invented a construction that dispenses with the need for such seals. I obtain such a construction by the use of a metal mass that is applied by spraying to fasten certain parts of the welder and build up the construction.

In the drawing:

FIG. 1 is a longitudinal sectional view of the welding torch of the present invention;

FIG. 2 is a transverse sectional view taken on the line 2—2 of FIG. 1;

FIG. 3 is a transverse sectional view taken on the line 3—3 of FIG. 1;

FIG. 4 is a fragmentary perspective view of a coolant tube forming part of the present invention; and FIG. 5 is a transverse sectional view taken on the line 5—5 of FIG. 1.

The welding torch of the present invention comprises a tubular core 10, a coolant tube 11 embracing the core, an inert-gas tube 12 connected to the core, and a metal mass 13 applied and built up on the core by spraying so as to bond the coolant tube and inert-gas tube thereto.

A wire electrode 14 is gripped by a collet 15, contained in a holder 16, which has a threaded connection with one end of the tubular core 10. A hollow rod 17 has an adjustable threaded connection with the other end of the core 10 and presses against the collet 15 to make it grip the electrode 14. A ceramic nozzle 18, which has a threaded connection with the holder 16, encloses the portion of the wire electrode 14 protruding from the holder. Inert gas supplied through the tube 12 enters the tubular core 10 and passes between the collet 15 and holder 16 and out through openings 19 in the holder into the nozzle 18. Coolant such as water supplied through the tube 11 is enabled to cool the electrode 14, collet 15, and holder 16 effectively, because the tube 11 has a good thermal bond with the tubular core 10, since the tube is wrapped around the core and is joined thereto by the sprayed metal mass 13.

The process of assembling the core 10, tubes 11 and 12, and metal mass 13 will now be described. The coolant tube 11, which is of copper, is made from a straight piece of tubing of circular section. A midportion of the tubing is swaged to square section and is bent to circular shape. Right angle bends are made near the ends of the square midportion, so that the coolant tube 11 is formed with a pair of generally parallel spaced legs 20 and an intermediate portion 21 which is appreciably more than 180° in arcuate length and lies in a plane that is generally perpendicular to the legs 20. The inside diameter of the portion 21 is equal to or slightly less than the outside diameter of the tubular core 10. The core, which is of steel, is inserted in the portion 21 so as to be gripped thereby about at its middle. A side opening is drilled in the core 10 between the ends of the portion 21 of the tube 11. A bent curved end 22 of the inert-gas tube 12, which is of copper, is inserted in the side opening in the core 10 so that the legs 20 of the coolant tube 11 extend along the inert-gas tube on opposite sides thereof. The assembly of core 10 and tubes 11 and 12 is now flame-sprayed with copper to an appreciable depth until the intermediate portion 21 and adjacent regions of the legs 20 of the tube 11 and the curved end 22 and the adjacent region of the tube 12 are completely covered and embedded. The result of the flame spraying is the copper mass 13, which solidly attaches the tubes 11 and 12 to the core 10 and provides a good thermal bond between the coolant tube 11 and the core 10 and a good seal between the gas tube 12 and the side opening in the core 10. The outside of the mass 13 is machined to the desired diameter and the inside of the mass is drilled and tapped to open the tube 11 to the inside of the core 10 and to provide the screw threads by which the holder 16 and hollow rod 17 are connected to the core. The gas tube 12 and the legs 20 of the coolant tube 11 extend along and without the hollow rod 17.

The hollow rod partially contains the electrode 14. The end of the hollow rod 17 remote from the core 10 is closed by a knob 23, by which the rod may be rotatably manipulated so as to be moved toward or away from the collet 15. The end of the rod 17 in the core 10 engages an adjacent end of the collet 15 to make the other end of the collet act against the interior of the holder 16 and thereby be squeezed into gripping engagement with the electrode 14. Thus, as the hollow rod 17 is rotated in one direction or the other by manipulation of the knob 23, the hollow rod is moved axially against the collet 15 to make it grip the electrode 14 or is moved axially away from the collet to enable to release the electrode.

The free ends of the legs 20 of the coolant tube 11 are inserted in, and soldered to, inlet and outlet passages 24 in a head 25 formed of brass. The end of the inert-gas tube 12 remote from the curved end 22 is inserted in, and soldered to, a gas passage 26 in the head 25. The hollow rod 17 slidably fits, and extends through, an opening in the head 25.

A brass sleeve 27 is now applied to the assembly of tubes 11 and 12, metal mass 13, and head 25 by being slipped longitudinally over the metal mass 13 into engagement with the head 25. The sleeve 27 has one end soldered to the head 25 and the other end soldered to the metal mass 13, which it tightly fits. The sleeve 27 loosely contains tubes 11 and 12 and hollow rod 17. The sleeve 27 and head 25 are now coated with a layer of insulating material. Coolant and inert gas are supplied to the passages 24 and 26 in the head 25 through flexible hoses 28, which have threaded connections with the head. The application of the sleeve 27 makes the assembly into a rigid welding torch. The sleeve 27, being of appreciable diameter, provides, through the sprayed metal mass 13 and tubular core 10, a rigid support of the holder 16, collet 15, and welding rod 14 on the head 25. At the same time the sprayed metal mass 13 seals the inert-gas tube 12 to the core 10 and thermally bonds the coolant tube 11 to the core without the need for seals that would require costly maintenance and replacement.

It is understood that the invention is not to be limited by the details given herein but that it may be modified within the scope of the appended claims.

The embodiments of the invention in which an exclusive property or privilege is claimed are defined as follows:

1. In a welder comprising an elongated electrode; a collet embracing an intermediate portion thereof; a holder containing the collet; and a tubular rod containing a portion of the electrode and having one end acting on the collet for urging the same against the holder to make the collet grip the electrode; the combination with the tubular rod and the holder; of a tubular core having the inside of one end connected with the said one end of the tubular rod and the inside of the other end connected with an end of the holder adjacent the said one end of the collet; a coolant tube having two legs extending along the tubular rod and an intermediate portion connecting the legs and curved about the tubular core so as to embrace the same; and a sprayed mass of metal applied to the exterior of the tubular core and extending radially outward sufficiently to completely cover and embed the said intermediate portion of the coolant tube and the adjacent regions of the legs thereof and to provide a thermal bond between the tubular core and the coolant tube.

2. In a welder comprising an elongated electrode; a collet embracing an intermediate portion thereof; a holder containing the collet; and a tubular rod containing a portion of the electrode and having one end acting on one end of the collet for urging the other end of the collet against the holder to make the collet grip the electrode; the combination with the tubular rod and the holder; of a tubular core having the inside of one end connected with the said one end of the tubular rod and the inside of the other end connected with an end of the holder adjacent the said one end of the collet; an inert-gas tube extending along the tubular rod and having a short bent end inserted into a side opening in the tubular core from the outside thereof; a coolant tube having two legs extending along the tubular rod and the inert-gas tube and on opposite sides of the latter, and an intermediate portion connecting the legs and curved about the tubular section so as to embrace the same; and a sprayed mass of metal applied to the exterior of the tubular core and extending radially outward sufficiently to completely cover and embed the said bent end of the inert-gas tube, the adjacent region thereof, the said intermediate portion of the coolant tube, and the adjacent regions of the legs thereof and to seal said bent end to the opening in the tubular core and to provide a thermal bond between the tubular core and the coolant tube.

3. In a welder comprising a holder; a collet located in the holder and having one end projecting axially outward of the holder beyond one end thereof; an electrode positioned in the collet; an elongated hollow rod aligned with the collet and extending outwardly of the collet and holder from one end of the collet in engagement with said one end of the collet; a head receiving a region of the hollow hod well spaced from the said one end thereof and having three passages for the inlet of an inert gas and for the inlet and outlet of coolant; and a sleeve loosely surrounding the hollow rod and having one end loosely enclosing said one end of the hollow rod, said one end of the collet, and said one end of the holder and the other end connected to the head; the combination therewith; of a tubular core having the inside of one end connected with the said one end of the holder and the inside of the other end connected with the said one end of the hollow rod; an inert-gas tube extending along and without the tubular rod and along and within the sleeve and having one end engaging the head at the inert-gas passage therein and the other end bent and inserted in a side opening of the tubular core from the outside thereof; a coolant tube having two legs located within the sleeve and without the hollow rod and extending along and on opposite sides of the inert-gas tube, the free ends of the legs engaging the head at the coolant passages therein; the coolant tube having an intermediate portion connecting the other ends of the legs and being curved to embrace the tubular core; and a mass of metal applied to the outside of the tubular core and connected with the inside of said one end of the sleeve, the mass of metal covering and embedding the bent end of the inert-gas tube, the adjacent region thereof, the said intermediate portion of the coolant tube, and the adjacent regions of the legs thereof, the mass of metal also sealing said bent end to the opening in the tubular core and thermally bonding the tubular core to the coolant tube.

References Cited
UNITED STATES PATENTS

| | | | |
|---|---|---|---|
| 2,783,360 | 2/1957 | Osborn | 219—75 |
| 3,083,289 | 3/1963 | Munro et al. | 219—75 |
| 3,309,492 | 3/1967 | Fields | 219—75 |

RICHARD M. WOOD, *Primary Examiner.*

B. A. STEIN, *Assistant Examiner.*